United States Patent Office 2,837,628
Patented June 3, 1958

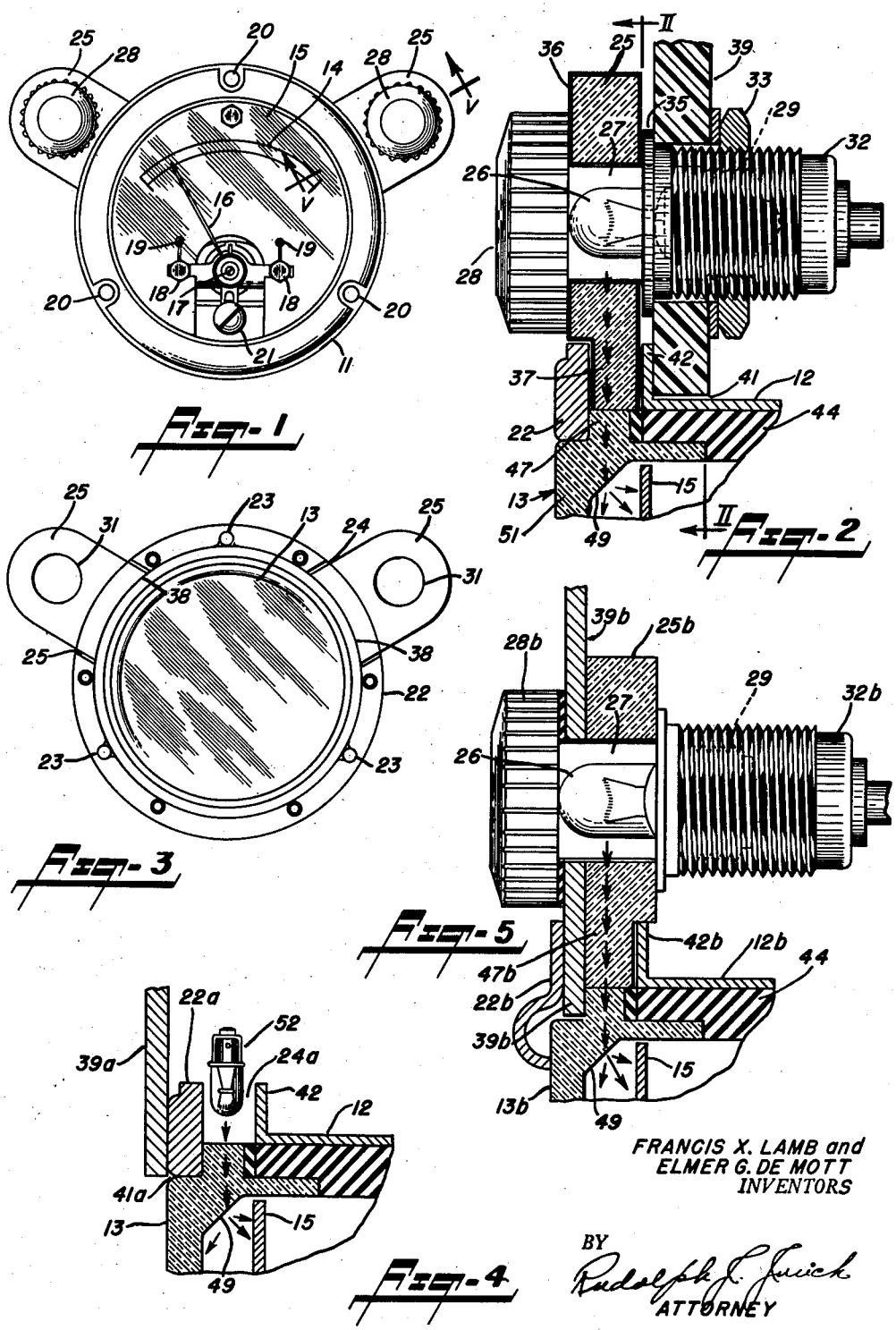

2,837,628

ILLUMINATED INSTRUMENT DIAL

Francis X. Lamb, East Orange, and Elmer G. De Mott, Chatham, N. J., assignors, by mesne assignments, to Daystrom, Incorporated, Murray Hill, N. J., a corporation of New Jersey Application September 22, 1954, Serial No. 457,704

10 Claims. (Cl. 240—2.1)

This invention relates to means for illuminating the dial of an electrical instrument and more particularly to an arrangement for illuminating the dial of an instrument of the rugged and sealed class.

An object of our invention, generally considered, is to provide an arrangement for the illumination of the dial of an electrical measuring instrument when the same is mounted, either on the back of a panel with associated lamps, or on the front of the panel with, or without, light-transmitting adapters.

Another object of our invention is to provide an instrument bezel ring peripherally encircling the instrument window and provided with slots which, though not visible from the front of the instrument, serve to transmit light to the edge of the window, said window being especially shaped so that the light is properly diffused to the dial of the instrument.

A further object of our invention is to convey the light from the illuminating lamp through light-transmitting adapters to the edge of the preferably thermoplastic window of the instrument without light leakage which would be visible to the eye.

Other objects and advantages of the invention will become apparent as the description proceeds.

In the drawing, wherein like reference characters denote like parts in the several views:

Figure 1 is a front view of an instrument associated with light-transmitting adapters and embodying our invention, the instrument being in this case mounted from the front of a panel;

Figure 2 is an enlarged fragmentary sectional view taken along the line V—V of Figure 1;

Figure 3 is a rear elevational view of the transparent cover, the bezel and the adapters, when viewed generally along the line II—II of Figure 2;

Figure 4 is an enlarged fragmentary sectional view, corresponding to Figure 2 but showing an arrangement in which the instrument is mounted from the back of a panel and with the light-transmitting adapters omitted; and Figure 5 is an enlarged fragmentary sectional view, on the line V—V of Figure 1, but assuming the instrument to be mounted on the back of the panel.

Referring first to Figure 1, the instrument designated 11 comprises a relatively-deep cup-like metal member, the front or outer portion of which is shown in Figure 2 and designated by the reference character 12. This member is usually referred to as the case and is closed by a transparent cover, or window 13. The case is of drawn metal and in a sealed instrument the cover is united to the case so as to provide a moisture-tight housing. A suitably-calibrated scale 14, carried by a scale plate 15, and cooperating pointer 16 are visible through the window 13.

The illustrated embodiment is of the permanent-magnet movable coil type, but inasmuch as the interior structure of the mechanism is not part of the invention, it is not specifically described, the interior parts being presented only in sufficient detail to facilitate a proper understanding of the invention. It may here be mentioned, however, that the pointer is carried by a movable coil which is supported for pivotal movement by suitable pivots and jewel screws, the upper jewel screw 17 being visible in Figure 1. Also, the scale plate 15 is secured in position by means of the three screws 18 threaded into suitable posts, so that said plate lies substantially in the plane of the case flange 42. The lower two of such screws also desirably retain conventional pointer stops 19 in proper position to prevent damage to the pointer upon rotation thereof beyond the scale range. A zero adjusting screw 21 passes through the instrument cover for performing its usual function.

In the embodiment illustrated in detail in Figures 2 and 3, the transparent cover 13 is held in place with respect to the case by means of a bezel 22, formed with the usual apertures 23 for receiving means, such as screws 20 shown in Figure 1, which pass through corresponding apertures in the flange 42 for holding it in place. In the present instance, the bezel is desirably die-cast and formed with a peripheral flange or skirt making it an inwardly-open shallow cup. The flange is formed with radial slots 24 which may vary in number from one to four or more, but usually two are desirable, as illustrated in Figure 3. When a two slot arrangement is used the slots are preferably located one each in the upper left hand and upper right hand quadrants, each slot being located in the back side of the die-cast bezel, so as not to be visible when the instrument is viewed from the front. Each slot extends radially from the outer periphery inward to the peripheral edge of the thermoplastic window 13, closely encircled by said flange, and held in place by the bezel 22 as shown most clearly in Figure 2, said slots acting as means for transmitting external light to the dial or scale plate 15.

In the embodiment of Figures 1, 2 and 3 we employ adapters 25 each of which comprises a generally-flat plate of transparent plastic material which has the property of readily conducting light and reflecting it back from its outer polished surface, so that little is dissipated even when transmitted over a relatively long distance. The purpose of the adapters is to convey light from small electric lamps 26, mounted in tubes 27 provided with insulating knurled heads 28. These tubes may have threaded bases 29 adapted for the transmission of power to said lamps. Each adapter 25 is formed with an aperture 31 (see Figure 3) of a size proper of snugly receive the lamp-enclosing tube 27, said tube being held in place therein by a threaded socket device 32 to which power may be supplied. A nut 33 is adapted to clamp the socket device 32 to the panel 39, the socket being provided with a flange 35 for this purpose.

Each adapter 25 is desirably first painted white and then black, the coatings being designated by the numeral 36, except for the edges adjacent the lamps in the apertures 31 and those adjacent the instrument window. It will also be seen that, in the present embodiment, the portion 37 of each adapter which fits in its bezel slot 24, and closes the light admitting spaces between the bezel and the flange 42 of the case 12, is cut away or decreased in thickness so as to fit said slot closely, as indicated most clearly in Figure 2. Also the edge of this portion 37 of the adapter adjacent the window 13 is desirably curved, as indicated at 38, Figure 3, to conform with the curvature of the periphery of the window 13 which it touches or closely approaches.

It will be seen from Figure 2 that the panel 39, to which the instrument is secured by conventional means, is not only apertured as indicated at 41 to receive the case 12, the flange 42 of which abuts the outer surface thereof, but is also provided with the necessary number of relatively-small apertures for receiving the lamp sockets 32.

The plastic window, or cover 13 is provided with a generally-cylindrical, axial-extending flange portion telescoping into the case and formed to have a large surface area of mutual contact with respect to the rubber insulating molding 44 in the case 12. The flange portion 47, of the cover, may have sealing compound 46 spread over such area as contacts the molding 44. The flat flange portion 47 of the transparent cover is the part closely approached by the adapters 25 for the transmission of light thereto, as indicated by the arrows. Said light is dispersed and diffused through the inner wall portion 49 of the cover. This portion 49 is desirably formed as an outwardly tapering or converging truncated cone, the ends of which respectively merge with the generally cylindrical flange 47 and the outer generally-flat lens portion 51, at about where the axially-extending flange diverges therefrom. The latter portion is of generally-uniform thickness, lies in a plane spaced from and parallel to that of the flange portion 47 and through it the interior parts of the instrument are viewed.

From the foregoing disclosure, it will be seen that we have provided means for transmitting light to the peripheral edge of the transparent cover of an instrument and dispersing such light to the scale plate, as indicated by the arrows in Figure 2. When the instrument is mounted on the front of the panel 39 the light adapters 25 convey the light to the instrument without light leakage which would be visible to the eye of the observer.

Figure 4 illustrates how such an instrument may be mounted on the back of a panel, here designated 39a. In this instance the bezel 22a of the instrument abuts the inner surface of the panel 39a. Inasmuch as the instrument entirely fills the aperture 41a in the panel, there is no need for otherwise shielding light which it is desired to transmit through slots 24a in the bezel, so that a simple light source adjacent each of said slots, designated by the reference numeral 52, may be here substituted for the special lamps, tubes and sockets used in the embodiment of Figure 2.

Referring now to the embodiment shown in Figure 5, there is shown a structure in which the case 12b of an instrument is disposed on the back of a panel 39b, while the bezel 22b, in this case somewhat different in shape from the bezel 22 of the preceding embodiment, is mounted on the outside of said panel. The transparent cover 13b is here mounted between the panel and the outstanding flange 42b of the case. In Figure 5 we show a light-transmitting adapter system similar to that of Figure 2, but it will be apparent the adapters are not necessary where only the outside of the panel 39b normally is visible to the observer. In the present instance, however, the adapters 25b are inverted, so that their flat sides lie against the inner surface of the panel 39b, with the knurled heads 28b of the lamp-enclosing tubes 27 on the outside of the panel and the socket portions 32b projecting inwardly. The enclosed lamps, although disposed in operative position at the back of the panel, extend through holes in, and are replaceable from the front of, the panel.

From the foregoing disclosure it will be seen that our invention permits the use of an instrument with a bezel so arranged that said instrument may be mounted on the back of the panel and illuminated by lamps mounted adjacent to the instrument; or the instrument may be provided with a bezel having slots and suitable for mounting in front of a panel and provided with adapters to facilitate transmission of the light from adjacent lamps to the edge of the instrument window. Said window is, in any instance, specially constructed for the proper distribution of light to the scale plate.

Although preferred embodiments of the invention have been disclosed, it will be understood that modifications may be made within the spirit and scope of the invention as recited in the following claims.

We claim:

1. An electrical instrument comprising a cup-shaped case with an open end terminating in an outwardly-directed flange formed with apertures to receive securing means; an instrument mechanism including a scale plate disposed within the case, said scale plate lying substantially in the plane of said flange; a transparent cover closing the open end of said case, said cover including an outwardly-extending flange portion overlying the said case flange, a central raised portion spaced from the scale plate and a generally cylindrical, axially extending ring portion telescoping into the said case, an inner wall portion formed as an outwardly converging truncated cone, the ends of which respectively merge with the inner surface of the central raised portion and the inner surface of the ring portion; a bezel overlying the cover flange and formed with apertures alined with the case flange apertures to receive means to secure the instrument to a panel; light admitting spaces between the bezel and the case flange; and illuminating means for directing light into the said spaces to the edge of the transparent cover flange for illuminating the scale plate.

2. The invention as recited in claim 1 in which the bezel is disposed on the front side of a panel on which the instrument is mounted and the illuminating means includes plastic light-transmitting adapters disposed on the rear of the panel and extending into the said light admitting spaces and lamps extending from the front and through holes in the panel and into apertures provided in the adapters.

3. The invention as recited in claim 1 wherein the bezel includes a depending skirt overlying the peripheral surface of the cover flange and the light admitting spaces are constituted by radial slots in the bezel skirt.

4. The invention as recited in claim 3 in which opaquely coated plastic adapter devices enclosing lamps are provided for directing light from the lamps through the light admitting spaces to the edge of the cover flange.

5. The invention as recited in claim 3 in which the bezel is disposed on the back side of a panel on which the instrument is mounted.

6. The invention as recited in claim 3 in which the instrument bezel is disposed on the front of a panel to which the instrument is mounted and the illuminating means includes plastic light transmitting adapters disposed on the front of the panel and in the said light admitting spaces and lamps extending into the adapters.

7. An electrical instrument comprising a cup-shaped base with an open end terminating in an outwardly directed flange formed with apertures to receive securing means; an instrument mechanism including a scale plate disposed within the case, said scale plate lying substantially in the plane of said flange; a transparent cover closing the open end of said case, said cover including a flange overlying the case flange, a central raised portion spaced from the scale plate, and a generally cylindrical ring portion telescoping into the case, an inner wall portion formed as an outwardly converging truncated cone, the ends of which respectively merge with the inner surface of the central raised portion and the inner surface of the ring portion; a bezel overlying the cover flange and formed with apertures alined with the case flange apertures to receive means to secure the instrument to a panel, said bezel including a skirt overlying the peripheral surface of the cover flange and provided with light admitting slots; transparent plastic adapters having ends extending into the said light admitting slots and into close proximity to the edge of the cover flange, said adapters having holes extending therethrough; lamps disposed within the adapter holes; and an opaque coating on the all exterior surfaces of the adapters except that edge proximate to the cover flange.

8. The invention as recited in claim 7 wherein the bezel and light adapters are disposed on the front of a panel to which the instrument is mounted and said lamps include contact terminals engaging sockets that are secured to the panel and alined with the holes in the adapters.

9. The invention as recited in claim 7 wherein the bezel is disposed on the rear of a panel to which the instrument is mounted.

10. In combination with a transparent plastic cover for an electrical instrument, said cover comprising a unitary disc-shaped member including a substantially flat base portion, cylindrical wall portions and a flat flange portion extending outwardly of the wall portions and lying in a plane spaced from and parallel to that of the base portion, a bezel for securing the said cover to the instrument said bezel including a depending skirt overlying the peripheral surface of the cover flange and including radial slots therein, apertured light transmitting members having ends extending into the bezel slots, lamps disposed in the said apertures, and an opaque coating on the light transmitting members except where they receive light from the lamps and where they transmit light to said cover.

References Cited in the file of this patent

UNITED STATES PATENTS

| | | |
|---|---|---|
| 2,202,142 | Carter | May 28, 1940 |
| 2,654,020 | Pittman | Sept. 29, 1953 |